though to yield upwardly as the thickness of the work may require.

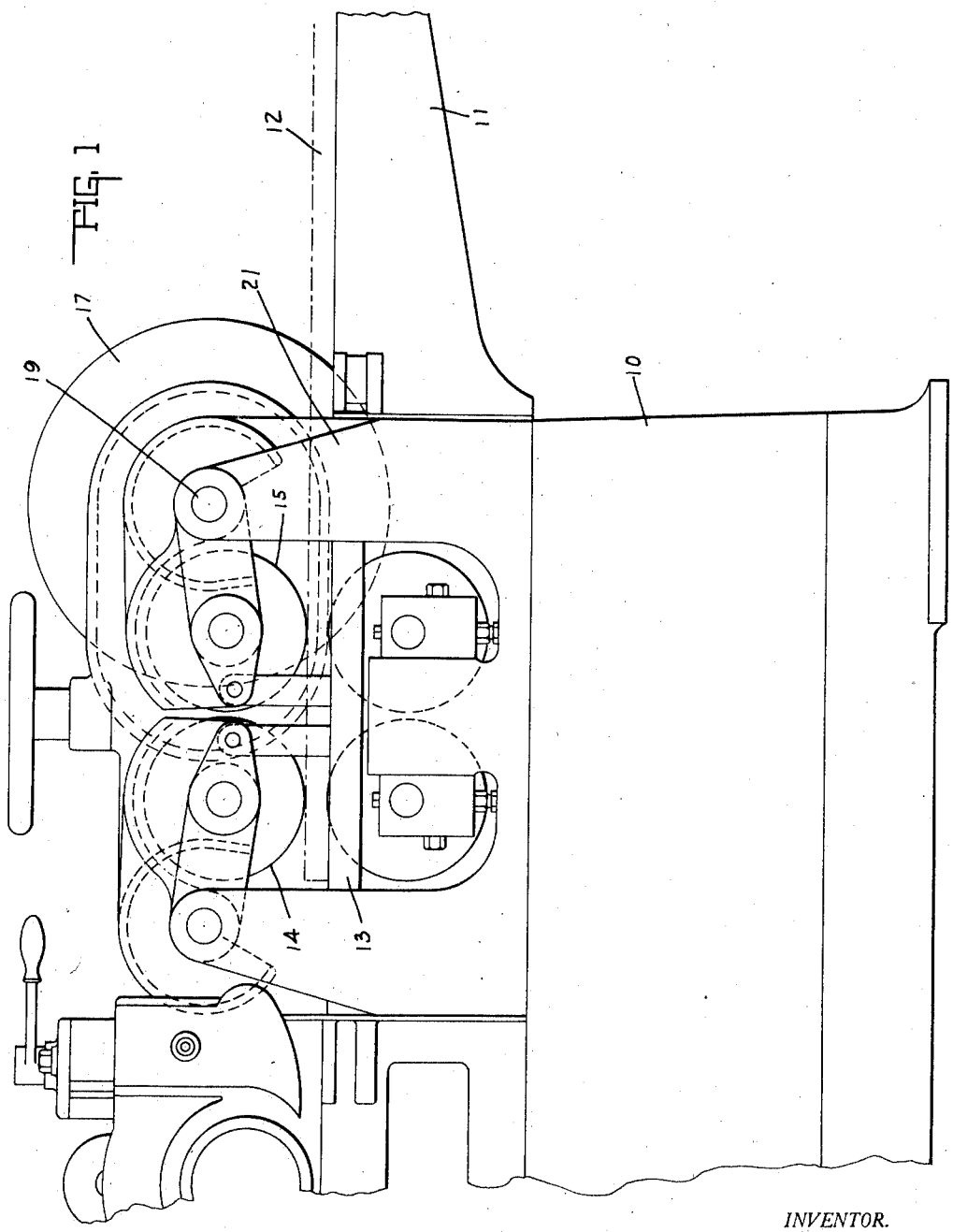

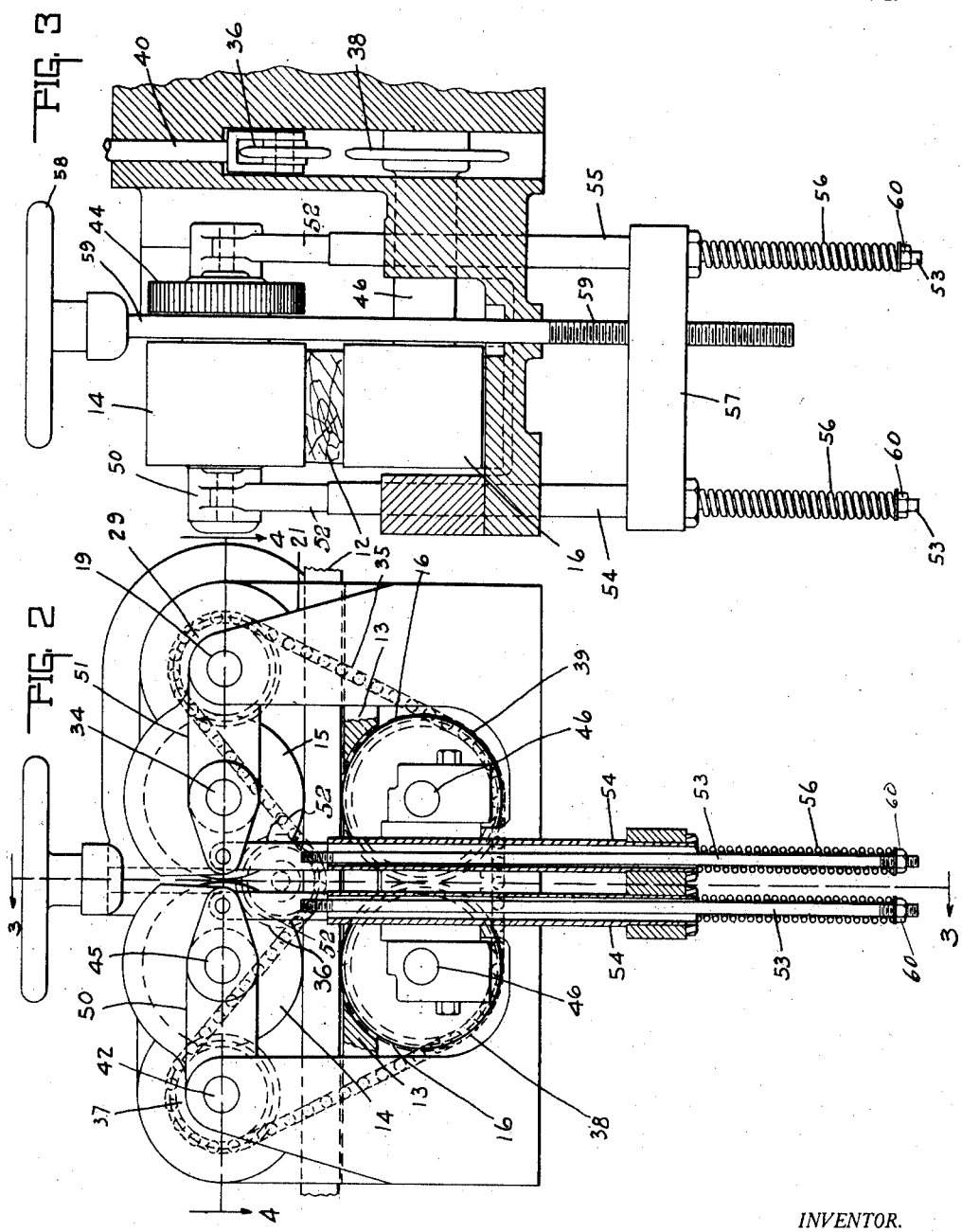

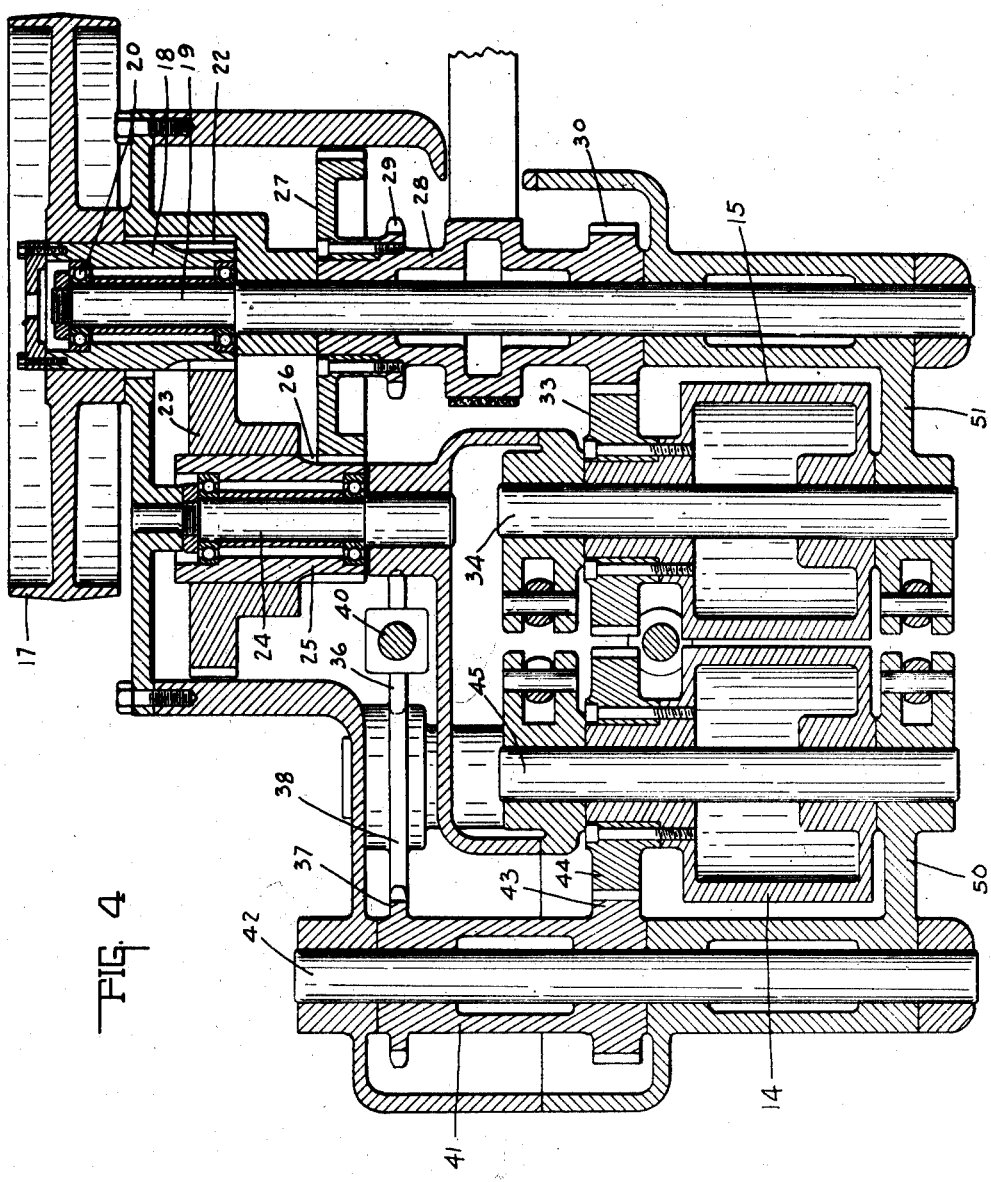

UNITED STATES PATENT OFFICE.

MONTE B. GATHMAN, OF SHELBYVILLE, INDIANA, ASSIGNOR TO ANTON VONNEGUT, OF INDIANAPOLIS, INDIANA.

FEEDING DEVICE.

1,390,777. Specification of Letters Patent. Patented Sept. 13, 1921.

Application filed August 20, 1920. Serial No. 404,776.

*To all whom it may concern:*

Be it known that I, MONTE B. GATHMAN, a citizen of the United States, and a resident of Shelbyville, county of Marion, and State of Indiana, have invented a certain new and useful Feeding Device; and I do hereby declare that the following is a full, clear, and exact description thereof, reference being had to the accompanying drawings, in which like numerals refer to like parts.

This invention relates to a molding machine for cutting wood and the like, and particularly to that part of the machine for feeding the timber or work into the cutters.

One of the main objects of the invention is to so construct the mechanism that the rolls may be positioned close to each other so as to feed in short stocks of wood.

Other advantages of the invention are in the adjustability of the feeding rolls in the manner of supporting and driving them, whereby they will yield to unevenness of the timber.

The full nature of this invention will be understood from the accompanying drawings and the following description and claims.

In the drawings Figure 1 is a side elevation of a portion of the molding machine embodying the feeding rolls. Fig. 2 is an end elevation of that portion of the machine showing the driving rolls, having parts broken away to show the tension springs. Fig. 3 is a section on the line 3—3 of Fig. 2. Fig. 4 is a section taken on the line 4—4 of Fig. 2.

In the drawings there is shown a molding machine having a base 10 with an extension table 11 mounted on the end thereof upon which is placed the timber 12 to be molded, shown in dotted lines. Extending through the machine there is a table 13 upon which the timber slides and is carried into the molding and cutting portion of the machine. The feeding mechanism consists of a plurality of rollers so placed as to yieldingly engage the timber and feed it forward into the cutters. For this purpose there are provided rollers 14 and 15 which engage the top surface of the timber and rollers 16 which engage the lower surface of the timber.

For driving the rollers there is provided the pulley 17, see Fig. 4, driven by any suitable means through a belt (not shown), said pulley having a hub 18 mounted upon the spindle 19 so as to revolve about said spindle on the bearings 20. The spindle 19 is secured rigidly within the frame 21 of the feeding mechanism. The hub 18 is provided with gear teeth 22 adapted to mesh with the gear teeth of the gear 23 which is mounted on the spindle 24 secured within said frame, said gear 23 being fixedly mounted upon a hub 25 which is provided with gear teeth 26 adapted to mesh with the teeth of the gear 27, which is in turn mounted on the spindle 19. The gear 27 is locked to a hub 28 which is provided with sprocket teeth 29 on one end and gear teeth 30 on the other end. The gear teeth 30 mesh with the teeth of the gear 33 which is mounted on a spindle 34 supported in said frame, said gear 33 being locked to the rotary feeding roll or drum 15 mounted upon said spindle 34.

In Fig. 2 there is shown the sprocket gear 29 driving the endless sprocket chain 35 which passes about an idler gear 36 and drives the sprocket wheels 37, 38 and 39. The idler 36 is mounted upon a spindle intermediate of the sprocket wheels 29 and 37 and adjustable by means of the screw shaft 40, see Fig. 3, for regulating the tension of the sprocket chain about the sprocket wheels.

The sprocket 37, see Figs. 2 and 4, driven from the pulley 17 through the sprocket 29 is mounted on a hub 41 rotatably supported by the spindle 42 mounted in said frame, said hub having a gear 43 on the other end thereof adapted to mesh with the gear 44 mounted on the spindle 45 carried by said frame. The gear 44 is keyed to the feeding roller 14 which lies in the same plane and adjacent to the roller 15 and is driven in the same direction.

The lower sprocket wheels 38 and 39, see Fig. 2, driven by the sprocket chain 35, drives the lower feeding rollers 16 which are fixedly secured upon the shafts 46 mounted in bearings in said frame. Therefore, the four feeding rollers are driven by the pulley 17 so that the two upper rollers operating in the same direction will engage the work to be fed into the machine on its upper surface and the two lower rollers likewise driven in the same direction, but in an opposite direction to the upper rollers, will engage the under side of the work to advance the same through the rollers.

The under rollers 16 are supported upon the shafts 46 in adjustable relation to the under side of the table 13 so that their peripheries are flush therewith, see Figs. 1 and 2, but the rollers 14 and 15 are mounted on and carried by independent arms 50 and 51 respectively, see Figs. 1 and 2, the arm 50 being pivoted at one end on the spindle 42 and the arm 51 on the spindle 19. This permits the rollers 14 and 15 to be raised and lowered into any adjusted position with respect to the work being fed, and still maintain driving contact with the driving gears. It will be observed that the driving construction couples the movement of the rollers 14 and 15 to said spindles, since the gears 44 and 33 locked to the rollers and carried thereby will remain a certain distance from said spindles and in constant engagement with the gears 43 and 30 respectively carried by said spindles.

To secure a yielding tension to compensate for uneven thickness of timber, the other end of the roller arms 50 and 51 are provided with hinged pins 52 which rest on top of the hollow tubes 54 and 55. Passing through these tubes and screwed into the pins 52 are rods 53 which are enough smaller in diameter than the holes in the tubes 54 and 55 to allow free movement of the rollers. Springs 56 are placed between the tubes 54 and 55 and nuts 60 on the ends of the rods 53. As the rollers yield, the pins 52 and rods 53 rise, compressing the springs 56 giving the necessary tension to feed the timber. This tension can be increased by adjusting the nuts 60 to further compress the springs.

For adjusting the rollers 14 and 15 to the desired height above the table 13 for feeding in timber of various thicknesses, the tubes 54, and 55, see Fig. 3, which fit into the holes in the frame 21 of the feeding mechanism, are clamped into a block 57 which is adjustable vertically by means of the handwheel 58, and bolt 59, which has the lower end screw threaded through the block 57 so as to yieldingly draw the rollers 14 and 15 downward and increase the pressure and frictional engagement thereof on the work being fed through. By means of this construction a great reduction in gearing is obtained and at the same time the feed rollers may be adjustably positioned in close proximity to each other for feeding the timber into the machine of varying thickness and short stocks.

The invention claimed is:

1. A self contained feeding mechanism for molding machines and the like, including a platform upon which the material is fed into the machine, two adjacent pairs of superposed rollers between which the material is adapted to pass, means for pivotally supporting a pair of opposite feed rollers, said pivotally supporting means being arranged to extend toward each other to maintain said feed rollers in substantially tangential relation and in close approximation to each other and the other feed rollers for engaging and feeding short stocks of material, and means for driving said feed rollers.

2. A self contained feeding mechanism for molding machines and the like, including a platform upon which the material is fed into the machine, two adjacent pairs of superposed rollers between which the material is adapted to pass, means for pivotally supporting a pair of opposite feed rollers, said pivotally supporting means being arranged to extend toward each other to maintain said feed rollers in substantially tangential relation and in close approximation to each other and the other feed rollers for engaging and feeding short stocks of material, and a single means for driving said feed rollers.

3. A self contained feeding mechanism for molding machines and the like, including a platform upon which the material is fed into the machine, two adjacent pairs of superposed rollers between which the material is adapted to pass, means for pivotally supporting a pair of opposite feed rollers, said pivotally supporting means being arranged to extend toward each other to maintain said feed rollers in substantially tangential relation and in close approximation to each other and the other feed rollers for engaging and feeding short stocks of material, sprocket gear means associated with each of said feeding rollers, a sprocket chain for said sprocket gears, and means associated with said sprocket chain for maintaining the same taut.

4. A self contained feeding mechanism for molding machines and the like, including a platform upon which the material is fed into the machine, two adjacent pairs of superposed feed rollers between which the material is adapted to pass, arms pivotally connected at one end of the machine and extending toward each other upon which a pair of opposite rollers are pivoted near said free ends of said arms such that said rollers are supported in substantially tangential relation to each other and in close approximation to each other for engaging and feeding short stocks of material, means connected with the free ends of said arms for supplying a yielding tension thereon for causing said pairs of rollers to frictionally engage and drive the material therethrough, and means for driving said feed rollers.

5. A self contained feeding mechanism for molding machines and the like, including a platform upon which the material is fed into the machine, two adjacent pairs of superposed feed rollers between which the material is adapted to pass, arms pivotally connected at one end of the machine and extending toward each other upon which a pair of opposite rollers are pivoted near said free ends of said arms such that said rollers are supported in substantially tangential relation to each other and in close approximation to each other for engaging and feeding short stocks of material, means connected with the free ends of said arms for supplying a yielding tension thereon for causing said pairs of rollers to frictionally engage and drive the material therethrough, and a single means for driving the pivotally supported rollers in the same direction and the other feed rollers in the other direction.

6. A self contained feeding mechanism for molding machines and the like, including a platform upon which the material is fed into the machine, two adjacent pairs of superposed feed rollers between which the material is adapted to pass, arms pivotally connected at one end of the machine and extending toward each other upon which a pair of opposite rollers are pivoted near said free ends of said arms such that said rollers are supported in substantially tangential relation to each other and in close approximation to each other for engaging and feeding short stocks of material, means connected with the free ends of said arms for supplying a yielding tension thereon for causing said pairs of rollers to frictionally engage and drive the material therethrough, a single means for driving the pivotally supported rollers in the same direction and the other feed rollers in the other direction, and means for adjustably supporting the other pair of adjacent feed rollers upon said machine.

7. A self contained feeding mechanism for molding machines and the like, including a platform upon which the material is fed into the machine, two adjacent pairs of superposed feed rollers between which the material is adapted to pass, arms pivotally connected at one end of the machine and extending toward each other upon which a pair of opposite rollers are pivoted near said free ends of said arms such that said rollers are supported in substantially tangential relation to each other and in close approximation to each other for engaging and feeding short stocks of material, means connected with the free ends of said arms for supplying a yielding tension thereon for causing said pairs of rollers to frictionally engage and drive the material therethrough, an endless chain for driving said feed rollers, and means for maintaining said endless chain means taut.

8. A self contained feeding mechanism for molding machines and the like, including a frame which houses the entire mechanism, a platform on which the material is fed into the machine, a plurality of feed rollers between which the material is adapted to pass, means for driving said rollers, inwardly projecting arms pivoted at the axis of said driving means for adjustably supporting said rollers, depending rods pivoted to the free ends of said arms, hollow tubes through which said rods pass, a block rigidly connected to said tubes, means for raising and lowering said block for varying thicknesses of timber, and compression springs disposed between the ends of said tubes and rods to provide tension for causing said rollers to frictionally engage and drive the material therethrough.

9. A feed mechanism for molding machines and the like including a platform on which the material is fed into the machine, a plurality of feed rollers between which the material is adapted to pass, means for driving said feed rollers, a spindle mounted adjacent each of said rollers on opposite sides thereof, gears mounted on said spindles, a common means for driving said gears, inwardly extending arms for carrying said rollers pivoted on said spindles, gears on said rollers for engaging said driving gears whereby said rollers may lie in close approximation of each other and be driven at uniform speed, and means for raising and lowering the free ends of said arms about said spindles as a pivot point whereby said rollers may be raised and lowered and maintain their driving connection with said driving gears.

In witness whereof, I have hereunto affixed my signature.

MONTE B. GATHMAN.